US006658259B2

(12) United States Patent
McIntosh

(10) Patent No.: US 6,658,259 B2
(45) Date of Patent: Dec. 2, 2003

(54) WIRELESS NETWORK HAVING A VIRTUAL HLR AND METHOD OF OPERATING THE SAME

(75) Inventor: Chris P. McIntosh, San Francisco, CA (US)

(73) Assignee: interWave Communications International, Ltd., Hamilton (BM)

( * ) Notice: Subject to any disclaimer, the term of this patent is extended or adjusted under 35 U.S.C. 154(b) by 41 days.

(21) Appl. No.: 10/094,105

(22) Filed: Mar. 7, 2002

(65) Prior Publication Data

US 2003/0171119 A1 Sep. 11, 2003

(51) Int. Cl.[7] .............................................. H04Q 7/20
(52) U.S. Cl. ...................... 455/462; 455/445; 455/433
(58) Field of Search ................................. 455/445, 433, 455/432.1, 462, 426.1, 426.2, 454, 465, 422.1, 403, 524, 560, 561, 552, 554.1, 466, 412.1, 413, 555; 709/219, 328, 329; 379/142.07

(56) References Cited

U.S. PATENT DOCUMENTS 5,734,700 A * 3/1998 Hauser et al. ............... 455/413

5,878,347 A * 3/1999 Joensuu et al. ............. 455/433

* cited by examiner

Primary Examiner—Nguyen T. Vo
Assistant Examiner—Eliseo Ramos-Feliciano
(74) Attorney, Agent, or Firm—Dorsey & Whitney LLP

(57) ABSTRACT

A communication network (100) is provided having a public and private network with a virtual home location registry. Generally, the public network (102) includes a public wireless network (112) with a public mobile switching center (MSC 114) The corporate network (104) includes a number of corporate wireless networks (106) located at a number of sites (110) each coupled to the public MSC (114), and several or all of the corporate wireless networks having a physical HLR (108). The corporate wireless networks (106) are coupled via an IP network (130) to one another and to an HLR management function (128). An corporate network operation management controller (OMC 126) is coupled to the public MSC (126), and to the routing function (128). The routing function (128) is configured to route access requests from the OMC (126) to the physical HLRs (108), and the OMC is configured to manage the physical HLRs to provide a single virtual HLR for the corporate wireless networks (106).

20 Claims, 6 Drawing Sheets

WIRELESS NETWORK HAVING A VIRTUAL HLR AND METHOD OF OPERATING THE SAME

FIELD

The present invention relates generally to communication networks, and more particularly to a private or corporate wireless network having a virtual HLR (home location registry) and a method of operating the same.

BACKGROUND

Home location registries or HLRs are used in communication systems to record and store information relating to users or subscribers of the systems. Prior art public communication systems typically include a small number of HLRs, for example, in the United States there are just two to three public HLRs per state per operator. A prior art communication system 10 with a small number of HLRs 12 is shown in FIG. 1. Referring to FIG. 1, each of the HLRs 12 are connected to a network of communication nodes or subsystems through a gateway mobile switching center (GMSC 16). Each communication subsystems in the communication network typically includes: (i) a GMSC 16 or a mobile switching center (MSC 18) to communicate with a public switched telephone network (PSTN 19) and other MSCs or GMSCs in the communication system 10, (ii) one or more base station controllers (BSCs 20) to control and communicate with one or more base transceiver stations (BTS 22), and (iii) a number of BTSs to communicate with mobile stations (MS 24). The HLRs 12 are further connected to an SS7 signaling network 26 through a mobile access part (MAP) interface or link to enable communication to other GMCs or visitor location registries (VLRs). Although not shown, transfer of signaling information between the MSCs 18 and GMSCs 16, as opposed bearer information, is also communicated through the SS7 signaling network 26. Each HLR 12 is identified to the SS7 network by a unique node number of address, for example, an ITU E-series address such as an E. 164 (PSTN telephone numbers) or E.212. The HLRs 12 are further connected through a maintenance interface, such as an E1 or T1 trunk, to an operation support system (OSS 28), which includes an operation management controller (OMC 30). The OMC 30 serves to configure and manage each of the HLRs 12. For example, the OMC 30 is used to add, delete or alter the profile of subscribers to the communication system 10; to configure the system by specifying to which HLR 12 to direct requests for information on a particular subscriber, and alert operators to failure or degraded performance of an HLR.

The above prior art communication system 10 suffers from a number of problems or disadvantages, including: vulnerability where failure of a single HLR 12 or more can take down the system; delay and congestion of the maintenance interface due to the necessity of backhauling information or access requests to the HLR even when connecting a communication path between two MSs 24 using the same MSC 18 resulting in inefficient utilization of system resources-and the expense of purchasing and operating large servers or switches on which the HLRs reside.

Another approach, which alleviates some of the above problems and is commonly used by operators of private or corporate communication systems, is shown in FIG. 2. Referring to FIG. 2, is this approach the communication system 10 has a large number of HLRs 12, each at a different site 32 and each associated with one or a small number of GMSCs or MSCs. Each HLR 12 has its own OMC 30, which are coupled to a telecommunications management network (TMN 34) through which operators can operate the OMC to configure and manage the associated HLR. It will be appreciated that this approach increases reliability by eliminating the possibility of the failure of a single HLR taking. a large portion of the communication system. Efficiency of the system is also increased by reducing or eliminating the need to backhaul information or access requests to one or a few large HLRs distant from the point of origination for the call.

Although in many ways an improvement over communication systems having a single or few large HLRs, the above approach is still not entirely satisfactory. One problem with the above approach is increases the time and expense incurred in configuring and managing the multiple HLRs. For example, adding, deleting or altering the profile of a user can require the operator to access all or a substantially of the HLRs. Moreover, adding HLRs can require reconfiguration of the communication system and all HLRs therein by highly skilled programmers, a time consuming an expensive task. Finally, it may not be possible to add HLRs in some countries or regions, since the number of unique node numbers by which each HLR is identified is limited and usually tightly regulated by a governmental authority.

Accordingly, there is a need for a communication system and method of operating the same that provides increased robustness and reliability. There is a further need for an system and method that consolidates control and management of operation functions, subscription functions and alarm functions for the multiple HLRs. There is a still further need for a system and method that improves utilization of system resources through the reduction or elimination of backhauling of messages from an originating MSC to a remote HLR.

The system and method of the present invention provides these and other advantages over the prior art.

SUMMARY

It is an object of the present invention to provide a communication system or network having a logical or virtual home location registry (HLR) and a method for operating the same.

In one aspect, the present invention is directed to a private or corporate network having a number of corporate wireless networks located at a number of sites, each of the corporate wireless networks having a physical HLR, an internet protocol (IP) network coupling each of the corporate wireless networks to one another, an operation management controller (OMC) coupled to a public mobile switching center (MSC), and an HLR management routing function or routing function coupled to the OMC and to the corporate wireless networks via the IP network. Generally, the routing function is configured to route access requests from the OMC to the physical HLRs, and the OMC is configured to manage the physical HLRs to provide a single virtual HLR for the corporate wireless networks.

In one embodiment, the OMC is an OMC of a single corporate enterprise, and the sites include separate branches of the enterprise. Alternatively, the corporate network includes an additional OMC of another private enterprise, and the sites include branches of both enterprises at separate sites, and branches of both enterprises at a shared site. Preferably, the corporate wireless network at the shared site includes an HLR containing information relating to branches of both enterprises at the shared site, and each of the OMCs are configured to manage each of the physical HLRs at their associated separate sites and the shared site to form a virtual HLR for the associated enterprise.

In another aspect, the present invention is directed to a communication network having a public and private or corporate network. Generally, the public network includes a public wireless network with a public mobile switching center (MSC). The corporate network includes a number of corporate wireless networks located at a number of sites, each of the corporate wireless networks coupled to the public MSC, several or all of the corporate wireless networks having a physical HLR. In accordance with the present invention, the corporate network further includes an OMC coupled to the public MSC, and an IP network, such as a private intranet, coupling each of the corporate wireless networks to one another. An HLR routing functions couples to the OMC and to the corporate wireless network via the IP network, and is configured to manage each of the physical HLRs to provide a single virtual HLR for the corporate network. Preferably, the corporate wireless networks communicate with one another using a proprietary signaling scheme including information identifying each physical HLR. More preferably,: the physical HLRs are identified by IP addresses, the HLR routing function includes a central address table (CAT) coupled to each of the number of corporate wireless networks and to the OMC via the IP network. Alternatively, the HLR routing function can include a domain name server, which identifies the particular physical HLR in which each named record is stored.

In another embodiment, the public network further includes a public switched telephone network (PSTN), and the corporate network further includes private branch exchanges (PBXs) at several or all of the sites linked to the PSTN and to the corporate wireless network at the site.

In yet another aspect, the present invention is directed to a method of operating a corporate network to provide a single virtual HLR for a number of corporate wireless networks. Generally, the method includes steps of: (i) coupling the physical HLRs of the corporate wireless networks to one another via an IP network; (ii) coupling an HLR management routing function to the routing function; and (iii) configuring the HLR management routing function to route access requests from the OMC to the physical HLRs, and configuring the OMC to manage each of the physical HLRs to provide a single virtual HLR.

In one embodiment, the sites are separate branches of a single private enterprise and the OMC is an OMC of the enterprise, and the step of configuring the OMC to provide a single virtual HLR involves configuring the OMC to provide a single virtual HLR for the separate branches of the enterprise. Preferably, the method further involves adding an OMC of another private enterprise, and configuring the OMCs to manage each of the physical HLRs at their associated separate sites and a shared site to form virtual HLRs for both enterprises.

Advantages of the apparatus and method of the present invention include any or all of the following:

(i) increased system robustness and reliability through the use of multiple independent HLRS;
(ii) consolidation of control and management functions for the HLRs;
(iii) consolidation of subscription management functions, i.e., adding, deleting or altering the profile of subscribers, for the HLRs;
(iv) consolidation of operation and management of alarm functions for the HLRs;
(v) improved utilization of system resources through the reduction or elimination of backhauling of messages from an originating MSC to a remote HLR;
(vi) where an SS7 routing function is included, a single SS7 node address for all of the multiple HLRS; and
(vii) less messaging or signaling between the HLRs and the SS7 network thereby improving efficiency.

BRIEF DESCRIPTION OF THE FIGURES

These and various other features and advantages of the present invention will be apparent upon reading of the following detailed description in conjunction with the accompanying drawings, where.

DETAILED DESCRIPTION

The present invention is directed to a communication network and method for operating a private or corporate network including a number of separate physical home location registries (HLRs) or HLRs to provide a virtual HLR.

A communication network according to the present invention will now be described with reference to FIG. 3. For purposes of clarity, many of the details of communication networks, and in particular of the interconnections between public and private wireless networks and wired networks, that are widely known and are not relevant to the present invention have been omitted.

Figure 1:
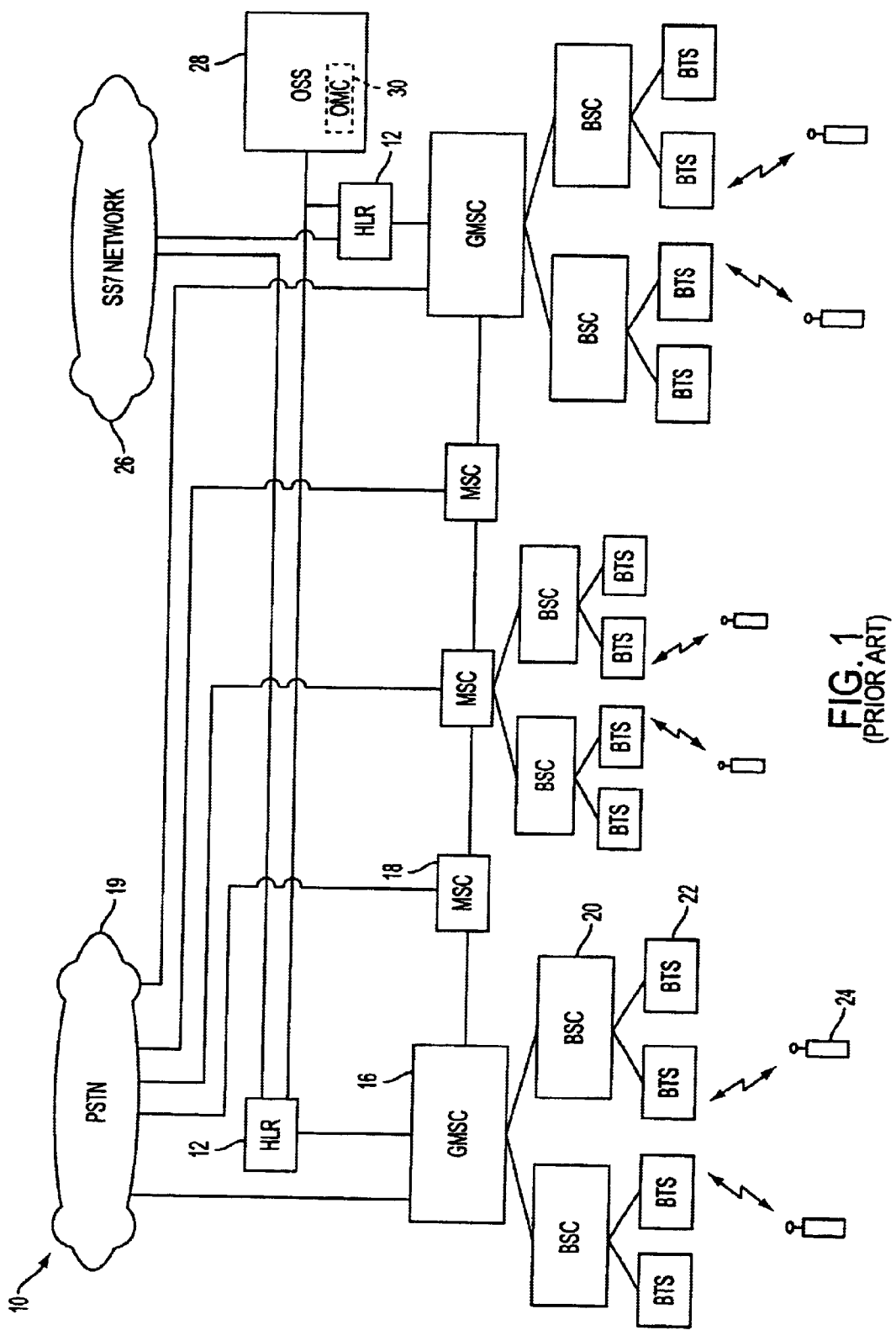
FIG. 1 (prior art) is an exemplary block diagram of a public GSM communication network including a home location registry (HLR) coupled to a SS7 signaling network.
Figure 2:
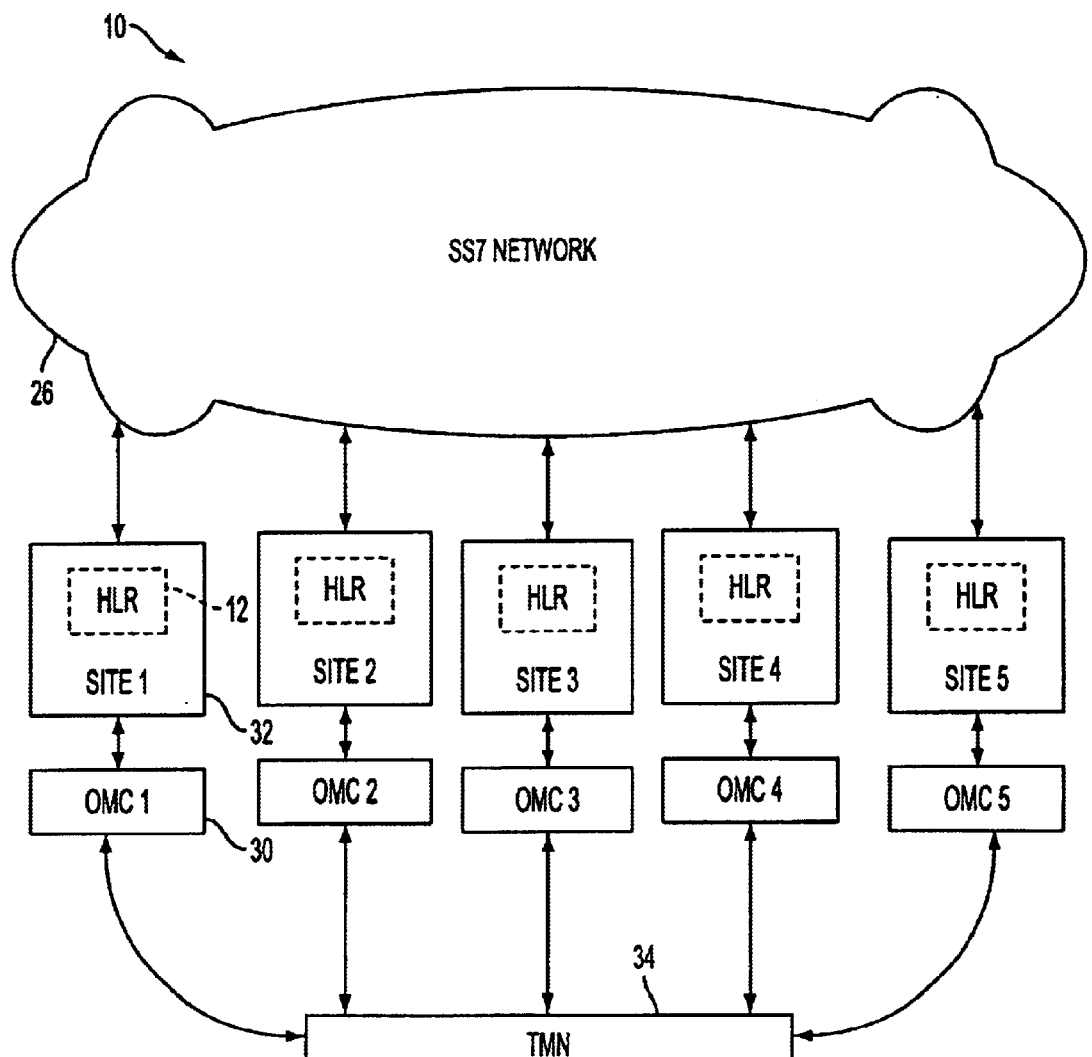
FIG. 2 (prior art) is an exemplary block diagram of a private wireless network including a number of HLRs coupled to a SS7 signaling network.
Figure 3:
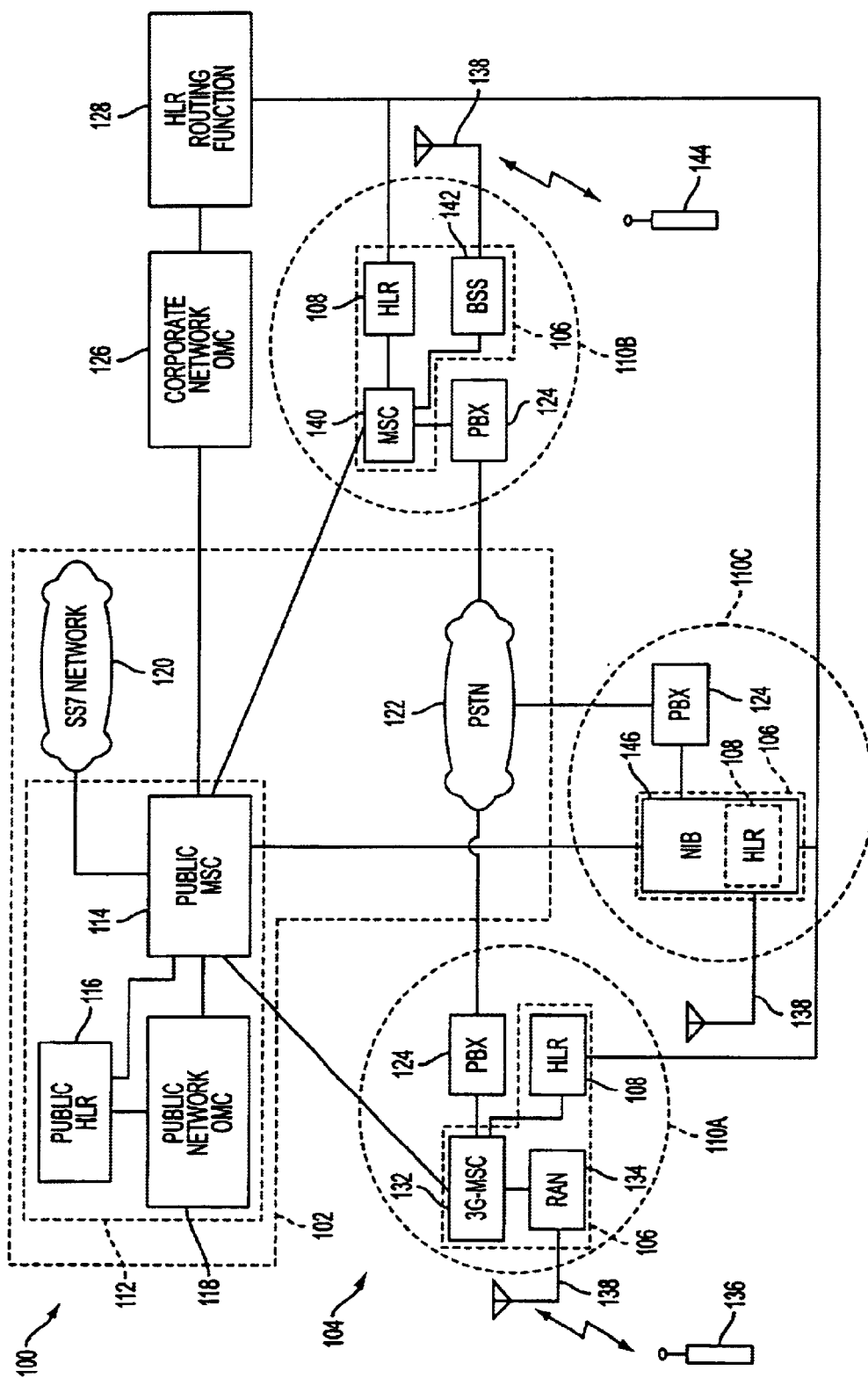
FIG. 3 is an exemplary block diagram of a communication network including a number of corporate wireless network each having a HLR, and an operations management center (OMC) configured to operate the HLRs to provide a virtual HLR according to an embodiment of the present invention.

FIG. 3 is an exemplary block diagram of a communication network 100 including public network 102 and a private or corporate network 104 having a number of private or corporate wireless networks 106 and private or corporate physical HLRs 108 at a number of different sites 110 (individually 110A, 110B and 110C). By corporate network 104 it is meant either a private communication network maintained and operated by a corporation or enterprise to facilitate communication between and among various offices or branches of the enterprise, or a communication network maintained be a service provider, such as Singulair, AT&T Wireless or Interwave Inc., to provide communication services to individual and/or corporate users or subscribers.

Referring to FIG. 3, the public network 102 includes a public wireless network 112 with a public mobile switching center (MSC 114), and a public HLR 116 and a public network operations management controller (OMC 118) coupled thereto. The public HLR 116 is configured to record and store information relating to users or subscribers of the communication network 100, and the OMC 118 is adapted to configure and manage the public HLR 116. Generally, the public network 102 includes an SS7 signaling network 120 through which the public MSC 114 is coupled to additional public HLRs and/or private HLRs (not shown) remote therefrom. Optionally, the public network further includes a public switched telephone network (PSTN 122) that can be linked or coupled to circuit switched telephones or private branch exchanges (PBXs 124) at one or more of the sites 110 in the corporate network 104.

In addition to the corporate wireless networks 106 and associated physical HLRs 108 at each separate site 110, the corporate network 104 generally includes a private or corporate network OMC 126 configured to manage each of the physical HLRs to provide a single virtual HLR for the corporate network, and an HLR management routing function 128 or HLR routing function configured to route access requests from the corporate network OMC to the physical HLRS. The HLR management routing function 128 and the physical HLRs 108 of the corporate wireless networks 106 are coupled to one another via an internet protocol (IP) network 130, such as an EP intranet or wide area network of the enterprise. Preferably, the corporate wireless networks 106 communicate with one another over the IP network 130 using a proprietary signaling scheme including information identifying each physical HLR 106 and MSC. More preferably, the physical HLRs 106 are identified by IP addresses, and the HLR routing function 128 includes a central address table (CAT) (not shown) coupled to each of the physical HLRs 108 or corporate wireless networks 106 and to the corporate network OMC 126 via the IP network 130. Alternatively, the HLR routing function 128 can include a domain name server (not shown), which identifies the particular physical HLR 108 in which each named record is stored.

As noted above, each site 110 of the corporate network 104 has a private or corporate wireless network 106, and, optionally, circuit switched telephones or PBX 124 as noted above. The corporate wireless network 106 can include a 3G or third generation cellular network, a 2G or global system for mobile communications (GSM) network, a self-contained network using 3G and/or GSM technology, or a wireless local area network (WLAN) such as an 802.11 or HiperLAN network.

Referring to FIG. 3, site 110A illustrates a site with a 3G network. The 3G network generally includes: (i) a 3G MSC 132 for communicating with the public MSC 114, the PSTN 122 and other MSCs in the corporate wireless network 104; (ii) a radio access network (RAN 134) for communicating via radio signals with mobile stations or user equipment terminals (UEs 136), a private or corporate physical HLR 108 for recording, maintaining and storing information related to subscribers or user of the corporate wireless network, and an antenna 138 for transmitting radio signals to and receiving radio signals from the UEs.

Site 110B illustrates a 2G or GSM network having a MSC 140 for communicating with the PSTN 122 and other MSCs in the public and corporate networks 102, 104, a base station subsystem (BSS 142) for communicating via radio signals with GSM mobile stations (MS 144), another physical HLR 108 separate from that of site 110A, and another antenna 138.

Site 110C illustrates a self-contained network 146 having a physical HLR 108 integrated therewith, and an antenna 138. One suitable example of a self-contained network 146 is a Network In a Box (NIB) from interWAVE Communications International Ltd., of Menlo Park, Calif. which can integrate with most public MSCs 114 and PBXs 124 to provide wireless interoperability with public and private communication networks. The self-contained network 146 or NIB can couple to the public MSC 114 through an inter MSC link, such as a MAP interface or link, or through a private A-interface, such as a Private A-link Intelligent Multiplexor (PALIM) interface function. This embodiment of a site 110 is particularly useful for installation in a building or facility of an enterprise.

Figure 4:
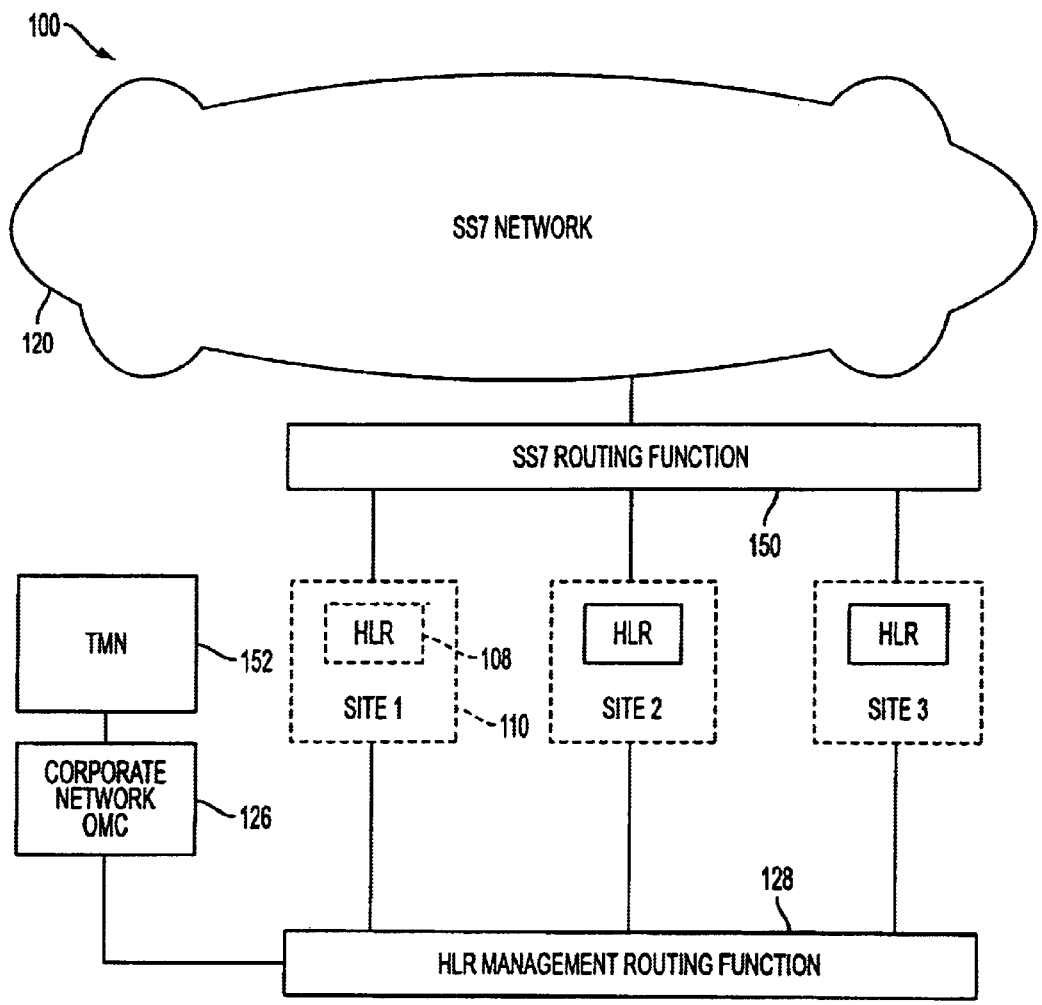
FIG. 4 is a functional block diagram of an embodiment of the communication network of FIG. 3 illustrating the connection of the HLRs to the SS7 network and the OMC, and the resultant virtual HLR according to an embodiment of the present invention.

In another aspect, illustrated in FIG. 4, the communication network 100 of the present invention further includes a SS7 routing function 150, to consolidate connections to the SS7 signaling network 118, thereby minimizing messaging between the physical HLRs 108 with and over the SS7 signaling network. FIG. 4 is a functional block diagram of an embodiment of the communication network 100 of FIG. 3 illustrating the connection of the physical HLRs 108 to the SS7 signaling network 118 and the OMC 126, and the resultant virtual HLR according to an embodiment of the present invention. Referring to FIG. 4, the physical HLRs 108 are coupled to the SS7 routing function 150 through a packet switched or circuit switched interface or link. The SS7 routing function 150 in turn couples to the SS7 signaling network 118 via a SS7 interface or link. Because all of the physical HLRs 108 are coupled to the SS7 signaling network 118 through this single connection from the SS7 routing function 150, all physical HLRs share a common unique node number. It will be appreciated that this eliminates the need to secure a new number for additional physical HLRs, greatly simplifying and reducing costs associated with expanding the systems. It should also be noted that the physical HLRs 108 sharing the SS7 node number need not be located near one another and may in fact be located in different countries or principalities and even on different continents.

In the embodiment shown, the communication network 100 further includes a telecommunications management network (TMN 152) coupled to OMC 126, and through which an operator can operate, configure and manage the virtual HLR.

Figure 5:
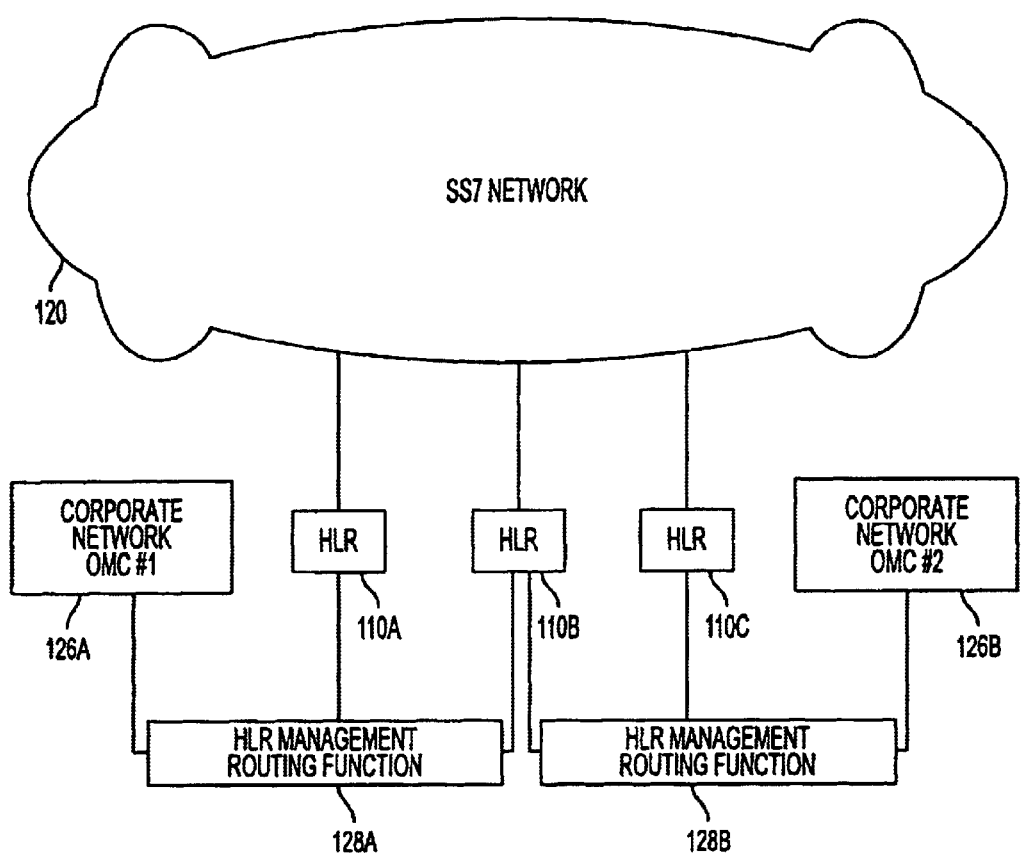
FIG. 5 is a functional block diagram of an embodiment of the communication network of FIG. 3 illustrating the connection of the HLRs to the SS7 network and OMCs of separate enterprises, and the resultant virtual HLRs according to another embodiment of the present invention.

In another embodiment, shown in FIG. 5, the communication network 100 serves at least two separate enterprises and includes separate branches of a individual private enterprise at separate sites 110A, 110C and a shared site 110B. FIG. 5 is a functional block diagram of an embodiment of the communication network 100 of FIG. 3 illustrating the connection of the HLRs 108 to the SS7 signaling network 118 and OMCs 126A, 126 B, of separate enterprises, and the resultant virtual HLRs according to another embodiment of the present invention. Referring to FIG. 5, the OMCs 126A, 126 B of each enterprise can be configured to manage the physical HLRs 108 at their associated separate sites 110A, 110C, and at the shared site 110B to form a virtual HLR for the associated enterprise. Although not shown it will be appreciated that the communication network 100 can further include separate TMNs to facilitate the operation of the OMCs 126A, 126B, and/or an SS7 routing function 150 or functions to provide a single connection to the SS7 signaling network 118 for the virtual HLR of each enterprise or for both enterprises.

Figure 6:
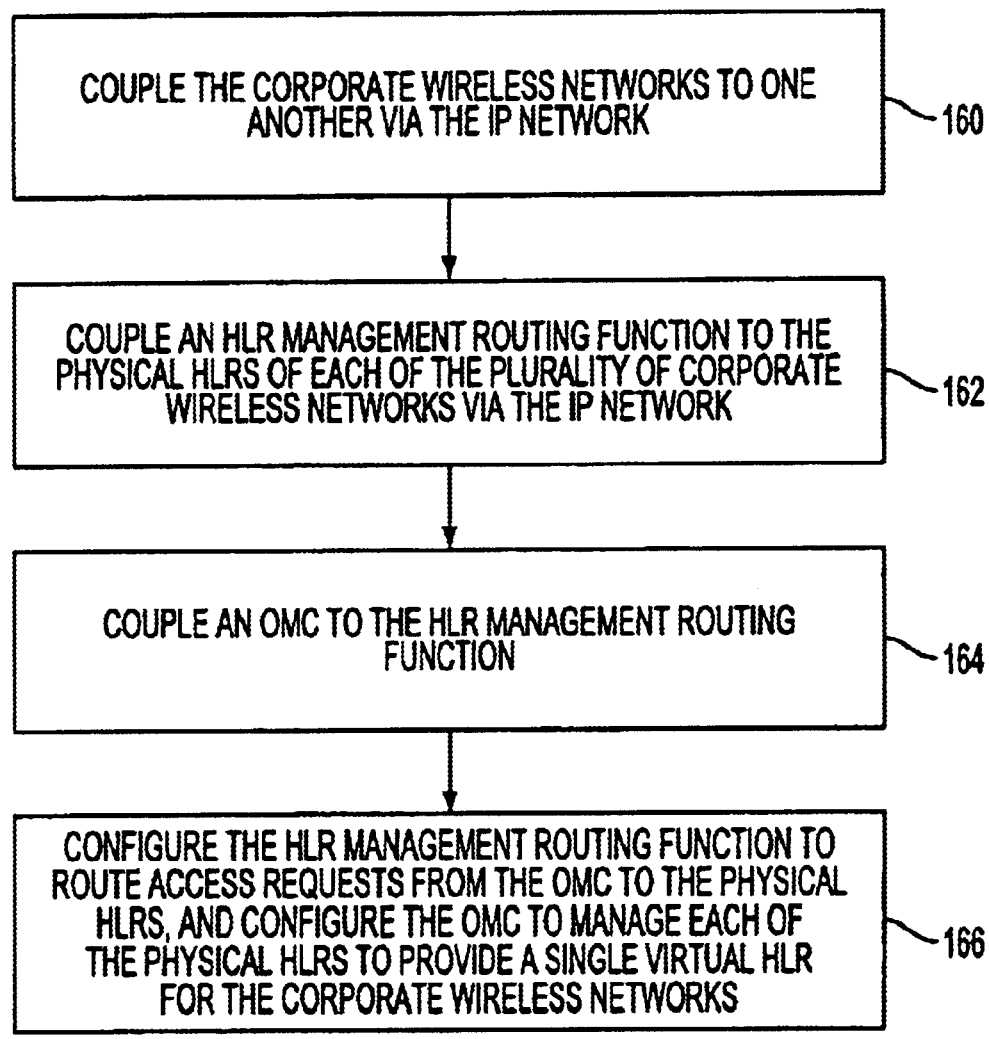
FIG. 6 is a flowchart showing an embodiment of a process for operating a communication network having a virtual HLR according to an embodiment of the present invention.

A method or process for operating a corporate network 104 to provide a single virtual HLR for a number of corporate wireless networks 106 according to an embodiment of the present invention will now be described with reference to FIG. 6. FIG. 6 is a flowchart showing an embodiment of a process for operating a corporate network 104 having a virtual HLR. Generally, in the method each of the corporate wireless networks 106 is coupled to one another via an IP network 130 (step 160). Next, an HLR management routing function 128 coupled to the physical HLRs 108 of each of the corporate wireless networks 106 via the IP network 130, and an OMC 126 is coupled to the HLR management routing function (steps 162 and 164). Finally, the HLR management routing function 128 is configured to route access requests from the OMC 126 to the physical HLRs 108, and the OMC is configured to manage each of the physical HLRs to provide a single virtual HLR for the corporate wireless networks 106 (step 166).

In one embodiment, the IP network 130 includes a private or corporate intranet, and the step of coupling each of the corporate wireless networks 106 to one another, step 160, is accomplished by: (i) coupling each of the corporate wireless networks to one another via the corporate intranet; and (ii) communicating between the corporate wireless networks 106 and the OMC 126 using a proprietary signaling scheme including information identifying each physical HLR 108.

In another embodiment, the communication network 100 includes two OMCs 126A, 126B, of separate enterprises controlling physical HLRs 108 at separate sites 110A, 110C, and at a shared sited 110B, and the step of configuring the OMC 126, step 166, involves configuring each of the OMCs to manage the physical HLRs at their associated separate sites and at the shared site to form a virtual HLR for the associated enterprise.

The foregoing descriptions of specific embodiments of the present invention have been presented for purposes of illustration and description. They are not intended to be exhaustive or to limit the invention to the precise forms disclosed, and obviously many modifications and variations are possible in light of the above teachirig. The embodiments were chosen and described in order to best explain the principles of the invention and its practical application, to thereby enable others skilled in the art to best use the invention and various embodiments with various modifications as are suited to the particular use contemplated. It is intended that the scope of the invention be defined by the claims appended hereto and their equivalents.

We claim:

1. A corporate network including:
a plurality of corporate wireless networks located at a plurality of sites, each ofthe corporate wireless networks having a physical home location registry (HLR);
an internet protocol (IP) network coupling each of the plurality of corporate wireless networks to one another;
an operation management controller (OMC) coupled to a public mobile switching center (MSC);
a routing function coupled to the OMC and to the plurality of corporate wireless networks via the IP network; and
wherein the routing function is configured to route access requests from the OMC to the physical HLRs, and the OMC is configured to manage each of the physical HLRs to provide a single virtual HLR for the plurality of corporate wireless networks.

2. A corporate network according to claim 1, wherein the IP network couples each of the physical HLRs of the plurality of corporate wireless networks to one another.

3. A corporate network according to claim 1, wherein the OMC comprises an OMC of a single corporate enterprise, and wherein the plurality of sites comprise separate branches of the enterprise.

4. A corporate network according to claim 3, further comprising an additional OMC of another corporate enterprise, and wherein the plurality of sites comprise branches of both enterprises at separate sites, and branches of both enterprises at a shared site.

5. A corporate network according to claim 4, wherein the corporate wireless network at the shared site comprises a physical HLR containing information relating to branches of both enterprises at the shared site, and wherein each of the OMCs are configured to manage each of the physical HLRs at their associated separate sites and at the shared site to form a virtual HLR for the associated enterprise.

6. A communication network comprising:
a public network including a public wireless network with a public mobile switching center; and
a corporate network including:
a plurality of corporate wireless networks located at a plurality of sites, each of the corporate wireless networks coupled to the public MSC, and each of the corporate wireless networks having a physical home location registry (HLR);
an internet protocol (IP) network coupling the physical HLRs of each of the plurality of corporate wireless networks to one another;
an operation management controller (OMC) coupled to the public MSC;
an HLR management routing function coupled to the OMC and to the physical HLRs of each of the plurality of corporate wireless networks via the IP network; and
wherein the HLR management routing function is configured to route access requests from the OMC to the physical HLRs, and the OMC is configured to manage each of the physical HLRs to provide a single virtual HLR for the plurality of corporate wireless networks.

7. A communication network according to claim 6, wherein the OMC and the physical HLRs communicate with one another using a proprietary signaling scheme.

8. A communication network according to claim 7, wherein the proprietary signaling scheme includes information identifying each physical HLR.

9. A communication network according to claim 8, wherein the physical HLRs are identified by IP addresses, and wherein the HLR management routing function comprises a central address table (CAT).

10. A communication network according to claim 8, wherein HLR management routing comprises a domain name server.

11. A communication network according to claim 6, wherein the public network further includes an SS7 network, and wherein the corporate network further includes an SS7 routing network through which the physical HLRs are coupled to the SS7 network to appear as a single virtual HLR to the SS7 network.

12. A communication network according to claim 6, wherein the public network further includes a public switched telephone network (PSTN), and wherein the corporate network further includes private branch exchanges (PBXs) at a number of the plurality of sites linked to the PSTN and to the corporate wireless network at the site.

13. A communication network according to claim 6, wherein the public network further includes a public switched telephone network (PSTN), and wherein the corporate network further includes private branch exchanges (PBXs) at a number of the plurality of sites linked to the PSTN and to the corporate wireless network at the site.

14. A communication network according to claim 6, wherein the OMC comprises an OMC of a single corporate enterprise, and wherein the plurality of sites comprise separate branches of the enterprise.

15. A communication network according to claim 14, further comprising an additional OMC of another corporate enterprise, and wherein the plurality of sites comprise branches of both enterprises at separate sites, and branches of both enterprises at a shared site.

16. A communication network according to claim 15, wherein the corporate wireless network at the shared site comprises a physical HLR containing information relating to branches of both enterprises at the shared site, and wherein each of the OMCs are configured to manage each of the physical HLRs at their associated separate sites and the shared site to form a virtual HLR for the associated enterprise.

17. In a corporate network including a plurality of corporate wireless networks located at a plurality of sites, a number of the corporate wireless networks having a physical home location registry (HLR), a method of operating the corporate network to provide a single virtual HLR for the plurality of corporate wireless networks, the method comprising steps of:

coupling the physical HLRs to one another via an internet protocol (IP) network;

coupling an HLR management routing function to the physical HLRs of each of the plurality of corporate wireless networks via the IP network;

coupling an operation management controller (OMC) to the HLR management routing function; and configuring the HLR management routing function to route access requests from the OMC to the physical HLRs, and configuring the OMC to manage each of the physical HLRs to provide a single virtual HLR for the plurality of corporate wireless networks.

18. A method according to claim 17, wherein the plurality of sites comprise separate branches of a single corporate enterprise and the OMC comprises an OMC of the corporate enterprise, and wherein the step of configuring the OMC to provide a single virtual HLR comprises the step of configuring the OMC to provide a single virtual HLR for the separate branches of the corporate enterprise.

19. A method according to claim 18, comprising the further step of coupling an additional OMC of another corporate enterprise to a physical HLR at a shared site among the plurality of sites.

20. A method according to claim 19, wherein the corporate wireless network at the shared site comprises a physical HLR containing information relating to branches of both enterprises at the shared site, and wherein the step of configuring the OMC comprises the step of configuring each of the OMCs to manage the physical HLRs at their associated separate sites and at the shared site to form a virtual HLR for the associated enterprise.

* * * * *